(12) United States Patent
Draeger

(10) Patent No.: US 11,432,540 B1
(45) Date of Patent: Sep. 6, 2022

(54) MOSQUITO TRAP

(71) Applicant: Dalen Products, Inc., Knoxville, TN (US)

(72) Inventor: William M. Draeger, Sevierville, TN (US)

(73) Assignee: Dalen Products, Inc., Knoxville, TN (US)

( * ) Notice: Subject to any disclaimer, the term of this patent is extended or adjusted under 35 U.S.C. 154(b) by 0 days.

(21) Appl. No.: 17/169,847

(22) Filed: Feb. 8, 2021

Related U.S. Application Data

(60) Provisional application No. 62/981,218, filed on Feb. 25, 2020.

(51) Int. Cl.
*A01M 1/10* (2006.01)
*A01M 1/04* (2006.01)

(52) U.S. Cl.
CPC .............. *A01M 1/106* (2013.01); *A01M 1/04* (2013.01)

(58) Field of Classification Search
CPC .......... A01M 1/106; A01M 1/04; A01M 1/10; A01M 1/00; A01M 1/20; A01M 1/2016; A01M 1/2044
See application file for complete search history.

(56) References Cited

U.S. PATENT DOCUMENTS

| | | | |
|---|---|---|---|
| D26,367 S | 12/1896 | Cohen | |
| 854,117 A | 5/1907 | Stark | |
| 1,328,936 A * | 1/1920 | Watson | A01M 1/2016 43/131 |
| D212,358 S | 10/1968 | Giordano | |
| 5,205,064 A * | 4/1993 | Nolen | A01M 1/04 43/112 |
| 5,464,613 A | 11/1995 | Barcay et al. | |
| 5,595,018 A | 1/1997 | Wilbanks | |
| 5,850,707 A | 12/1998 | Fell et al. | |
| 6,138,402 A * | 10/2000 | Wotton | A01M 1/106 43/107 |
| 6,508,032 B2 | 1/2003 | Lin | |

(Continued)

FOREIGN PATENT DOCUMENTS

| | | |
|---|---|---|
| EP | 2084962 A1 | 8/2009 |
| WO | 1999022596 A1 | 5/1999 |
| WO | 2012078184 A1 | 6/2012 |

OTHER PUBLICATIONS

Colin Purrington, Spartan Mosquito Eradicator (review), Feb. 19, 2020, Mississippi, USA.

(Continued)

*Primary Examiner* — Timothy D Collins
*Assistant Examiner* — Maria E Graber
(74) *Attorney, Agent, or Firm* — Luedeka Neely Group, PC

(57) ABSTRACT

A trap for flying insects includes a housing having a plurality of housing apertures and a tank located interior of the housing. The tank has an insect killing agent within an interior of the tank and a plurality of tank apertures adjacent an upper portion of the tank in communication with the interior of the tank for access of flying insects into the interior of the tank. The tank apertures are located proximate the housing apertures to provide a path for flying insects to travel from locations exterior of the housing to the tank apertures and into the tank. The trap also includes an insect attractive illumination located proximate the tank apertures.

4 Claims, 7 Drawing Sheets

(56) References Cited

U.S. PATENT DOCUMENTS

| | | |
|---|---|---|
| D569,475 S | 5/2008 | Szymanski |
| D590,041 S | 4/2009 | Schneidmiller et al. |
| D612,447 S | 3/2010 | Galili |
| D654,141 S | 2/2012 | Wilbanks |
| D660,395 S | 5/2012 | Jan |
| D777,291 S | 1/2017 | Seaton |
| D786,389 S | 5/2017 | Zemel et al. |
| D814,603 S | 4/2018 | Yu et al. |
| D819,773 S | 6/2018 | Rocha et al. |
| D826,367 S | 8/2018 | Yu et al. |
| D835,227 S | 12/2018 | Rocha et al. |
| D854,118 S | 7/2019 | Chang et al. |
| 2003/0070348 A1* | 4/2003 | Spragins ............... A01M 1/026 43/121 |
| 2004/0128903 A1* | 7/2004 | Wexler ............... A01M 29/34 43/122 |
| 2005/0169955 A1 | 8/2005 | Barak et al. |
| 2007/0175085 A1* | 8/2007 | Chen ............... A01M 1/223 43/112 |
| 2009/0100743 A1* | 4/2009 | Prater ............... A01M 1/04 43/112 |
| 2012/0266519 A1* | 10/2012 | Wright ............... A01M 1/24 43/113 |
| 2013/0298444 A1* | 11/2013 | Strube ............... A01M 1/106 43/107 |
| 2016/0242405 A1* | 8/2016 | Zhang ............... A01M 29/12 |
| 2017/0258068 A1* | 9/2017 | Eom ............... A01M 1/08 |
| 2018/0014526 A1 | 1/2018 | Hirsch et al. |

OTHER PUBLICATIONS

Mosquito XT, Mosquito Control Trap Systems, Information, http://www.kingandassociatesnea.com/information.htm, Manufactured and distributed by King Marketing dba King & Associates of Northeast AR, Inc., Paragould, Arkansas, USA, Feb. 18, 2020.

Renate C. Smallegange et al., Sugar-fermenting yeast as an organic source of carbon dioxide to attract the malaria mosquito *Anopheles gambiae* Research, Malaria Journal 2010, 9:292, Published Oct. 25, 2010.

* cited by examiner

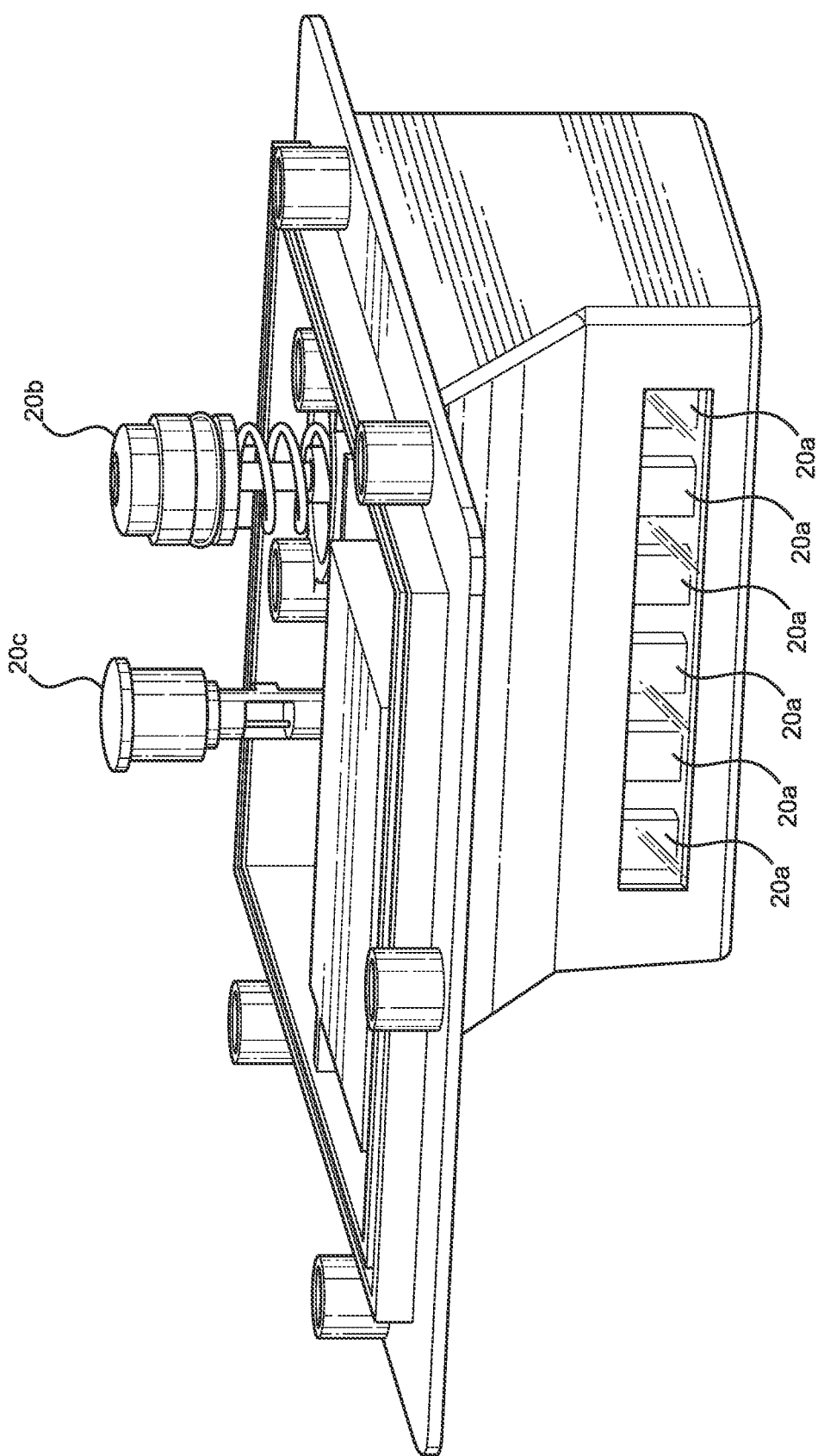

MOSQUITO TRAP

FIELD

This disclosure relates to the field of traps. More particularly, this disclosure relates to a trap configured to attract and kill mosquitos.

BACKGROUND

Improvement is desired in regards to traps for attracting and killing mosquitos. What is desired is a trap that is economical and easy to maintain, and which is configured to be effective for attracting and killing mosquitoes, and is aesthetically pleasing and easy to use.

SUMMARY

The above and other needs are met by an improved trap for flying insects.

In one aspect, a trap according to the disclosure includes a housing having a plurality of housing apertures and a tank located interior of the housing. The tank has an insect killing agent within an interior of the tank and a plurality of tank apertures adjacent an upper portion of the tank in communication with the interior of the tank for access of flying insects into the interior of the tank. The tank apertures are located proximate the housing apertures to provide a path for flying insects to travel from locations exterior of the housing to the tank apertures and into the tank. The trap also includes an insect attractive illumination located proximate the tank apertures.

In another aspect, a trap according to the disclosure includes a housing having a plurality of housing apertures and a tank located interior of the housing. The tank has an insect killing agent within an interior of the tank and a plurality of tank apertures in communication with the interior of the tank for access of flying insects into the interior of the tank. The tank apertures are located proximate the housing apertures to provide a path for flying insects to travel from locations exterior of the housing to the tank apertures and into the tank. An insect attractive illumination is located proximate the tank apertures.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein:

FIGS. 5A and 5B show an electronics module of the trap.

DETAILED DESCRIPTION

Figure 1:
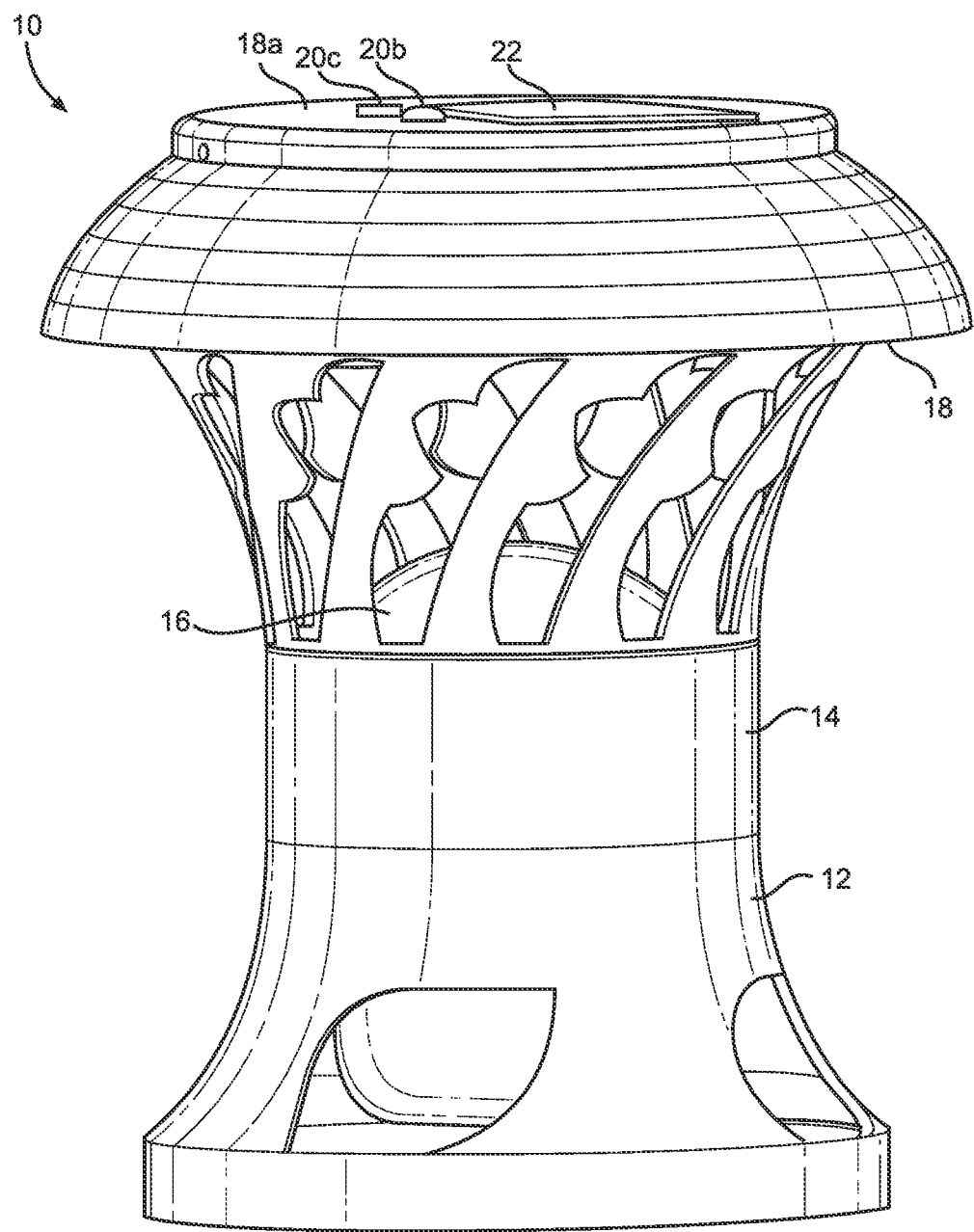
FIG. 1 is a perspective view of a mosquito trap according to the disclosure.

With initial reference to FIG. 1, there is shown a mosquito trap 10 according to the disclosure. The trap 10 is configured especially for mosquitos but is also useful for trapping various flying and other bugs, insects and the like. The trap 10 is also configured to be ornamental in appearance and aesthetically pleasing.

Figure 2:
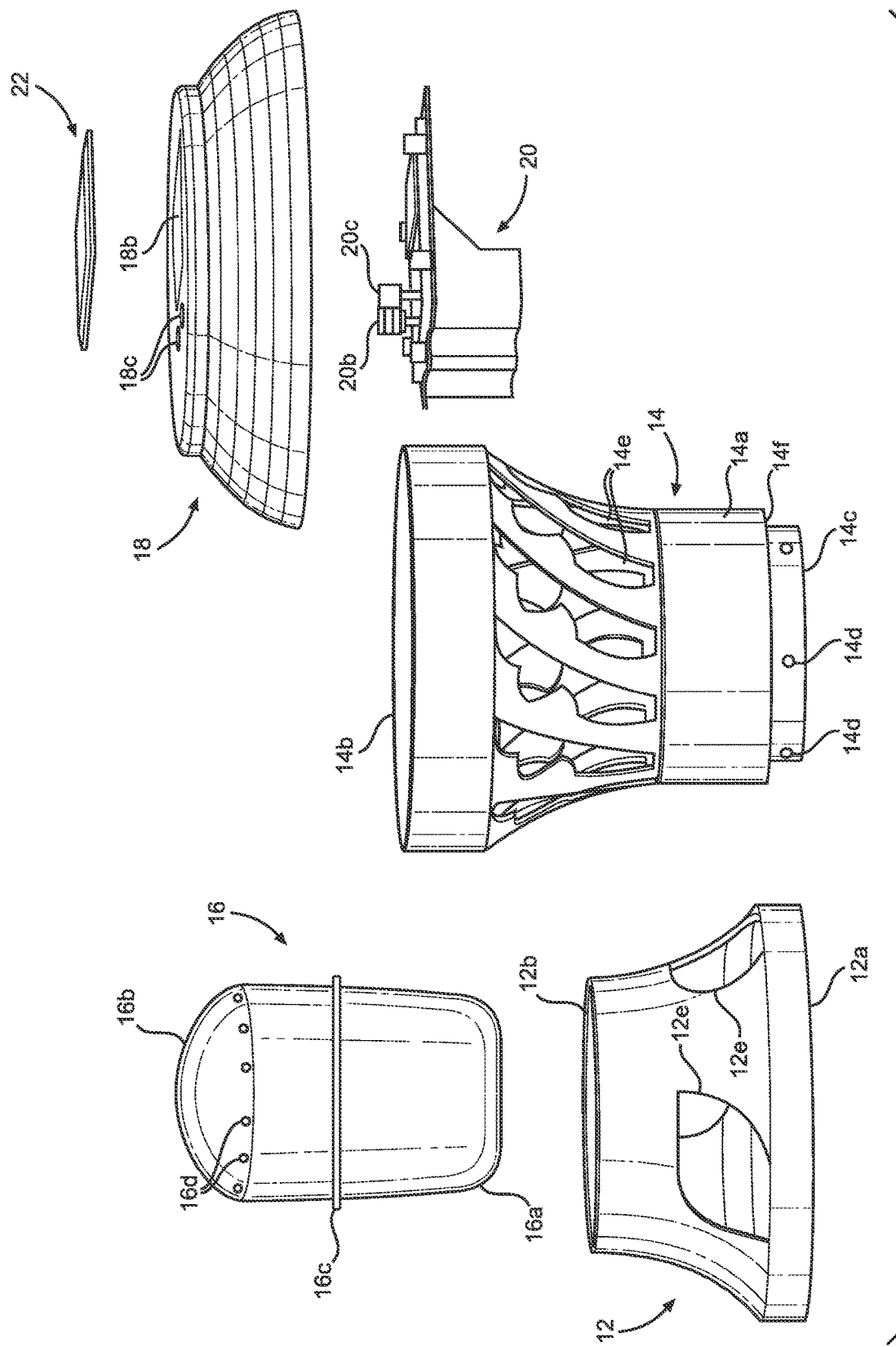
FIG. 2 is an exploded view showing the components of the trap of FIG. 1.
Figure 3:
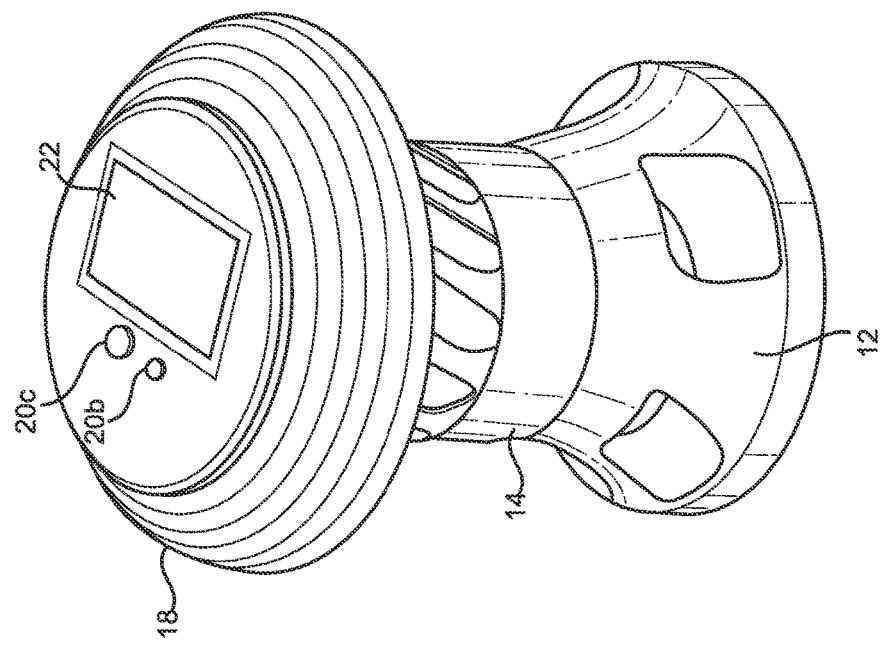
FIG. 3 shows details of a top of the trap.
Figure 3:
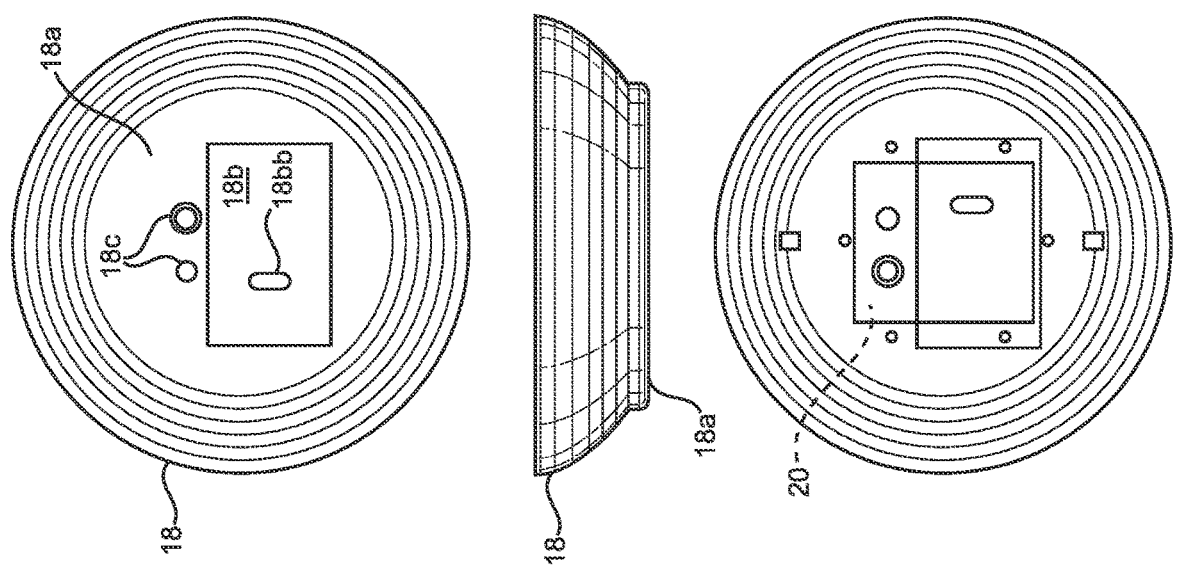
Figure 4:
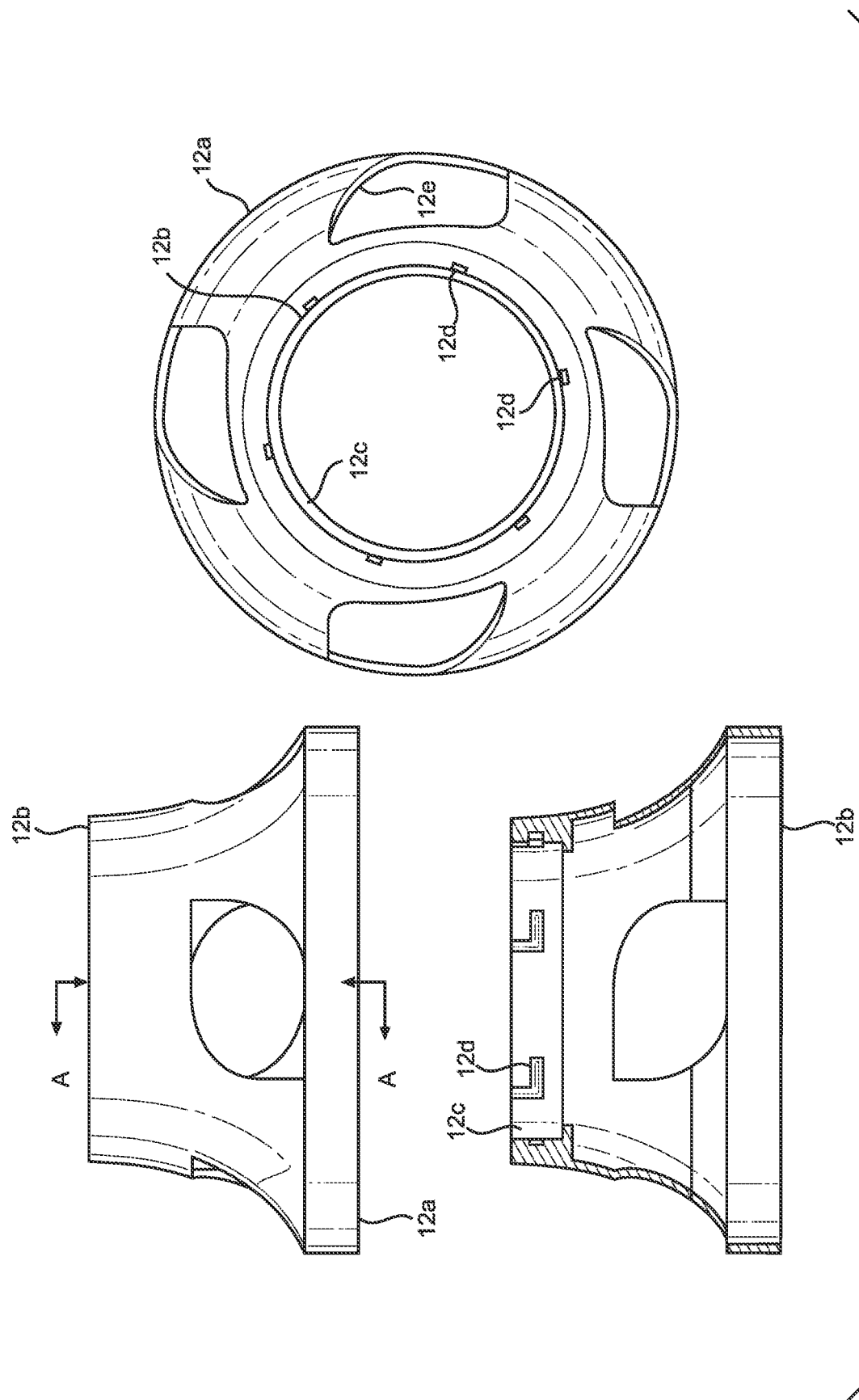
FIG. 4 shows a bottom of the trap.

As shown in FIG. 2, the trap 10 includes a base or bottom 12, a center or middle section 14, a tank 16, a top 18, an electronics module 20, and a solar cell 22. The bottom 12, middle section 14, and top 18 all desirably snap-fit together.

The bottom 12 is configured as a flared cylinder with a broad open lower end 12a and a smaller open upper end 12b. The broad lower end 12a provides stable footing and inhibits tipping over of the trap 10. The upper end 12b is sized to receive and support a lower end of the middle section 14, as described more fully below. In this regard, the upper end 12b has an annular slot 12c having L-shaped receivers 12d formed on an outer sidewall of the slot 12c in the material of the bottom 12 between the outer surface of the bottom 12 and the slot 12c. The receivers 12d are in the form of an L-shaped blind bore, with the upper end of the receivers 12d open to the upper end 12b and the lower end of the receivers 12d closed. The bottom 12 also includes openings 12e configured to provide venting and aesthetics.

The middle section 14 is configured as a flared cylinder with a smaller open lower end 14a and a larger open upper end 14b, so as to be flared oppositely of the bottom 12. The lower end 14a has a downwardly extending and recessed annular edge 14c configured to be received by the annular slot 12c. Projections 14d in the form of dimples are uniformly spaced around the exterior of the annular edge 14c and located to be slidably received within the receivers 12d. In this regard, when the edge 14c is seated in the slot 12c, with the projections 14d seated in the receivers 12e, it will be appreciated that the bottom section 12 and the middle section 14 may be rotated relative to one another so as to locate the projections 14d at the closed or blind end of the receivers 12d and thereby lock the lower section 12 and the middle section 14 together during assembly. The rotation may be reversed to unlock the lower section 12 and the middle section 14 for disassembly. The middle 14 also includes openings 14e configured to provide venting and aesthetics, as well as an access path for mosquitoes to enter the trap 10 adjacent an upper end of the tank 16. The openings 14e are desirably uniformly located about the circumference of an upper portion of the middle section 14. As will be observed, the annular edge 14c is recessed or spaced inwardly of the adjacent portion of the lower end 14a from which it extends. This provides an interior annular ledge or shelf 14f onto which a corresponding feature of the tank 16 is seated, as detailed below.

The tank 16 is seated within the middle section 14 and stores a preferably liquid killing agent. The tank 16 has a lower end 16a and an opposite rounded upper end 16b. An outwardly extending annular rim 16c extends outwardly proximate a central portion of the tank 16 and is configured to seat onto the annular ledge or shelf 14f of the middle 14. The tank 16 includes a plurality of openings 16d spaced apart and adjacent the upper end 16b of the tank 16 to permit mosquitos and the like to access the interior of the tank 16 for exposure to the killing agent. The openings 16d are desirably uniformly located about the circumference of the upper end 16b of the tank 16 so as to be proximate the openings 14e of the middle 14. The openings 16d are desirably sized to enable flying insects such as mosquitos to enter the tank 16 therethrough. In this regard, the openings 14e are desirably larger than the openings 16c 16d to provide a path for mosquitos and flying insects between the exterior of the trap 10 into the tank 16.

The interior of the tank 16 is preferably a dark color and resembles the interior of a hollow tree trunk or the like holding water which is a preferred site for mosquitos to lay eggs. The killing agent may be any FDA approved mosquito killing agent. The killing agent may also have mosquito attractant properties if desired. However, in the event the killing agent does have attractant properties it will be appreciated that it is supplemental to the primary attractant properties provided by light emitted by the electronics module 20 which attract the mosquitos to the upper end of the tank 16.

The top 18 is configured to be frictionally seated, preferably snap-fit, onto the upper end 14b of the middle 14 and is decoratively shaped. An upper surface 18a of the top 18 includes a recess 18b configured to receive the solar cell 22. The recess 18b includes an aperture 18bb for electrical communication between the solar cell 22 and the electronics module 20. The electronics module 20 is mounted to the underside of the top 18 opposite the upper surface 18a. The upper surface 18a also includes apertures 18c for passage of control switches of the electronics module 20.

Figure 5A:
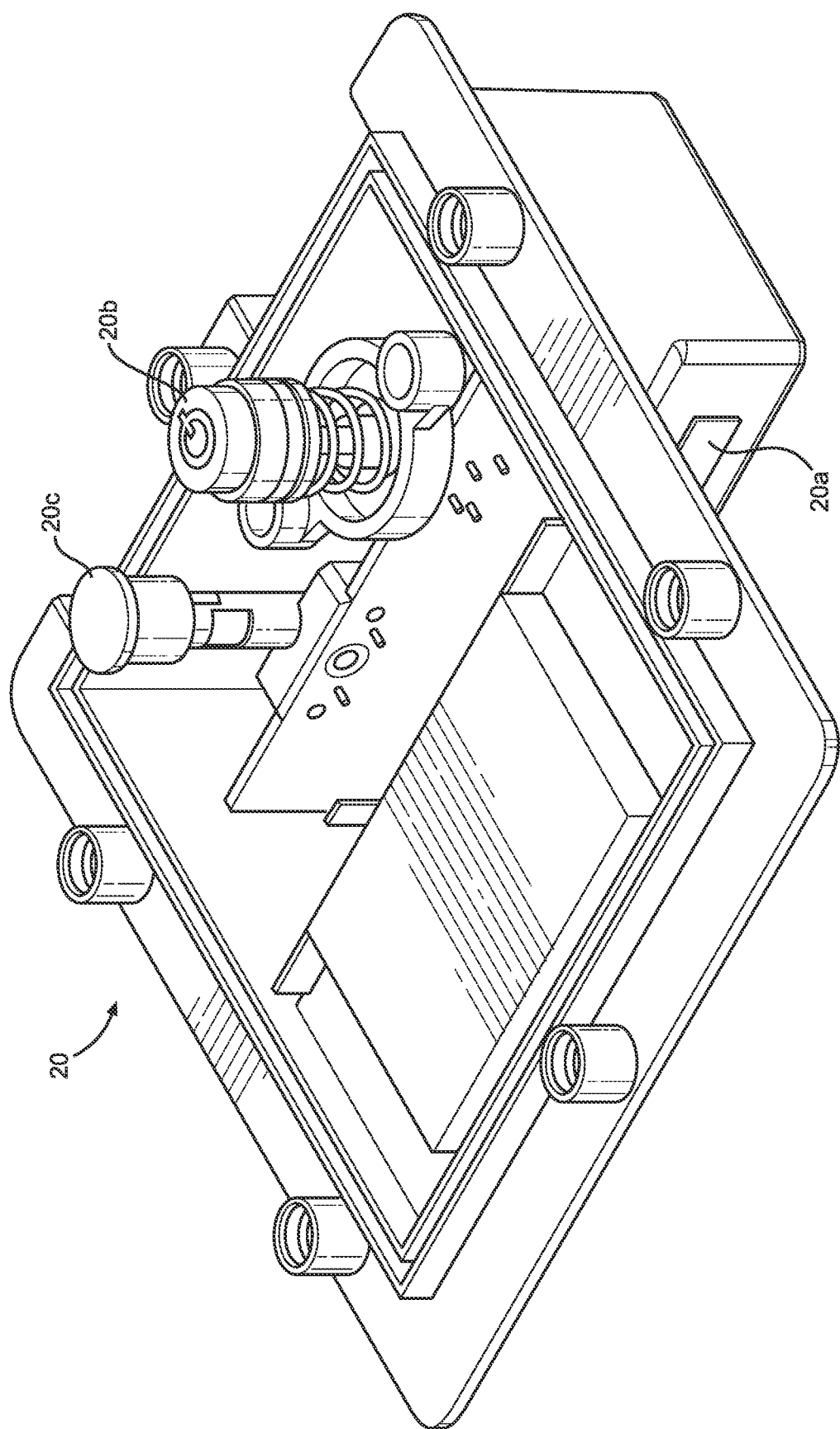
Figure 6:
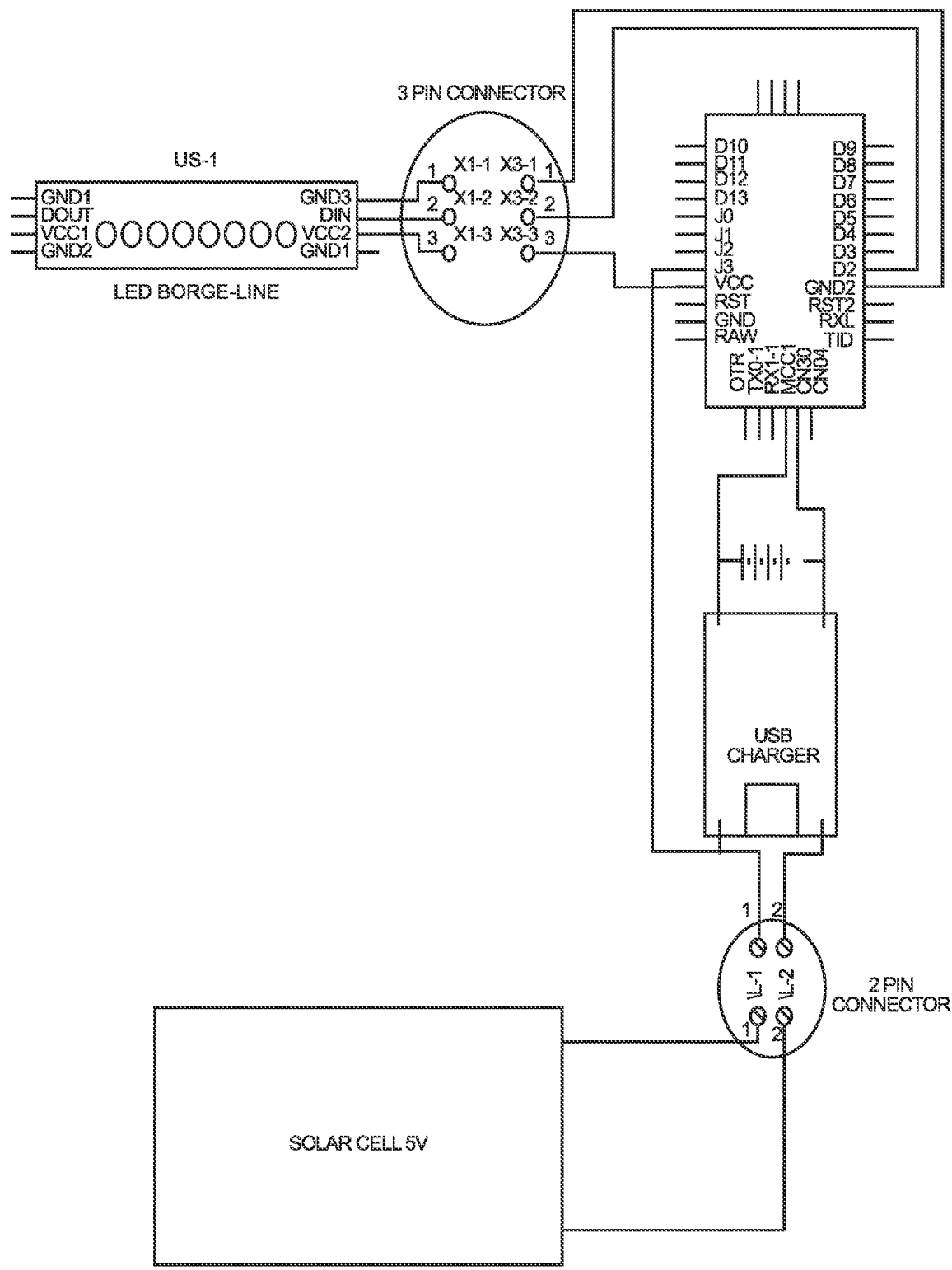
FIG. 6 shows an electronics circuit of the trap.

With reference to FIGS. 5A and 5B, the electronics module 20 is configured to mount to the underside of the top 18 opposite the upper surface 18a and is preferably is powered by a rechargeable battery, such as a 3.7 volt, 2500 mah Ni-ion battery, with the solar cell 22 configured to recharge the battery. For example, the solar cell 6 may be a 5 volt-0.5 watt cell. The electronics module 20 includes the circuit shown in FIG. 6 to serve as a microcontroller and is configured to include light emitting diodes 20a to provide light in a desired manner to attract mosquitos.

The diodes 20a are controlled by the module 20 which is programmed to display the diodes 20a in a desired manner. For example, in one embodiment the diodes 20a all illuminate in the same light frequency for a desired time and change frequency in a desired cycle. In this regard, the most preferred light frequencies are 470 nm, 502 nm, and 660 nm. The module 20 is desirably operated to cycle through the desired light frequencies for a time period of about 15 minutes each, with a 15-minute period of no light output. For example, 470 nm for 15 minutes, then 502 nm for 15 minutes, then 660 nm for 15 minutes, then no light for 15 minutes, then returning to 470 nm to repeat the cycle. The module 20 also includes an on/off switch 20b and a light sensor 20c that senses daylight and cooperates with the microcontroller to prevent illumination of the diodes 20a when light corresponding to daylight conditions is sensed.

The trap 10 is configured to provide an ornamental structure that is also configured to attract and kill mosquitos. The mosquitos are attracted by the illumination effects offered which draw the mosquitos near the upper end of the tank 16, which provides a dark and moist area which is attractive to mosquitos. Once mosquitos enter the tank 16, they are exposed to the killing agent. Generally speaking, mosquitos that enter the tank 16 die in the tank 16.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A trap for flying insects, comprising:
   a housing having an interior shelf in an interior of the housing and a top removably positionable onto an upper end of the housing, the upper end of the housing including a plurality of housing apertures;
   a tank supported in the interior of the housing by the interior shelf and located below the top, the tank having an insect killing agent within an interior of the tank and a plurality of tank apertures adjacent an upper portion of the tank in communication with the interior of the tank for access of flying insects into the interior of the tank, the tank apertures being located proximate the housing apertures to provide a path for flying insects to travel from locations exterior of the housing to the tank apertures and into the tank; and
   an insect attractive illumination located proximate an underside of the top above the tank.

2. The trap of claim 1, wherein the trap is configured to attract and kill mosquitos.

3. The trap of claim 1, wherein the killing agent is a liquid killing agent.

4. A trap for flying insects, comprising: a housing having an interior shelf in an interior of the housing and a plurality of housing apertures; a tank located in an interior of the housing and supported by the interior shelf, the tank having an insect killing agent within an interior of the tank and a plurality of tank apertures in communication with the interior of the tank for access of flying insects into the interior of the tank, the tank apertures being located proximate the housing apertures to provide a path for flying insects to travel from locations exterior of the housing to the tank apertures and into the tank; and an insect attractive illumination located proximate the tank apertures.

\* \* \* \* \*